United States Patent
Shimatani et al.

(10) Patent No.: US 8,449,660 B2
(45) Date of Patent: May 28, 2013

(54) POLYTETRAFLUOROETHYLENE POROUS MEMBRANE, METHOD FOR PRODUCING SAME, AND WATERPROOF AIR-PERMEABLE FILTER

(75) Inventors: Shunichi Shimatani, Osaka (JP); Akira Sanami, Osaka (JP)

(73) Assignee: Nitto Denko Corporation, Osaka (JP)

( * ) Notice: Subject to any disclaimer, the term of this patent is extended or adjusted under 35 U.S.C. 154(b) by 268 days.

(21) Appl. No.: 13/123,682

(22) PCT Filed: Sep. 29, 2009

(86) PCT No.: PCT/JP2009/066958
§ 371 (c)(1),
(2), (4) Date: Apr. 11, 2011

(87) PCT Pub. No.: WO2010/052976
PCT Pub. Date: May 14, 2010

(65) Prior Publication Data
US 2011/0192283 A1    Aug. 11, 2011

(30) Foreign Application Priority Data
Nov. 4, 2008 (JP) .................................. 2008-283206

(51) Int. Cl.
*B01D 53/22* (2006.01)
(52) U.S. Cl.
USPC .................... 96/11; 95/45; 95/52; 95/4; 95/7; 95/12
(58) Field of Classification Search
USPC ................ 95/45, 52; 96/4, 7, 11, 12
See application file for complete search history.

(56) References Cited

U.S. PATENT DOCUMENTS

| | | | | |
|---|---|---|---|---|
| 5,807,633 A | * | 9/1998 | Tamaru et al. | 428/373 |
| 5,834,528 A | * | 11/1998 | Tanaka et al. | 521/145 |
| 6,080,182 A | * | 6/2000 | Shaw et al. | 606/213 |
| 6,261,979 B1 | * | 7/2001 | Tanaka et al. | 442/370 |
| 6,471,687 B2 | * | 10/2002 | Butler et al. | 604/891.1 |
| 6,682,576 B1 | * | 1/2004 | Kiyotani et al. | 55/486 |
| 7,976,751 B2 | * | 7/2011 | Hayashi et al. | 264/127 |
| 2002/0170434 A1 | * | 11/2002 | Kawano et al. | 96/11 |
| 2009/0227165 A1 | * | 9/2009 | Imai | 442/304 |
| 2009/0269641 A1 | * | 10/2009 | Harada | 429/30 |
| 2010/0206660 A1 | | 8/2010 | Horie et al. | |
| 2010/0242733 A1 | | 9/2010 | Shimatani | |
| 2011/0212294 A1 | * | 9/2011 | Kato | 428/131 |

FOREIGN PATENT DOCUMENTS

| | | |
|---|---|---|
| JP | 50-021075 | 3/1975 |
| JP | 53-134066 | 11/1978 |

(Continued)

*Primary Examiner* — Jason M Greene
*Assistant Examiner* — Anthony Shumate
(74) *Attorney, Agent, or Firm* — Hamre, Schumann, Mueller & Larson, P.C.

(57) ABSTRACT

A first unsintered sheet made of PTFE having a standard specific gravity of 2.16 or more and a second unsintered sheet made of PTFE having a standard specific gravity of less than 2.16 are laminated, and a pressure is applied to a resulting laminated body so as to obtain a pressure-bonded article. The pressure-bonded article is stretched in a specified direction at a temperature lower than a melting point of PTFE, and then the pressure-bonded article is stretched further in the specified direction at a temperature equal to or higher than the melting point of PTFE or heated to a temperature equal to or higher than the melting point of PTFE. Thereafter, the pressure-bonded article stretched in the specified direction is stretched in a width direction perpendicular to the specified direction at a temperature lower than the melting point of PTFE.

8 Claims, 2 Drawing Sheets

FOREIGN PATENT DOCUMENTS

| | | |
|---|---|---|
| JP | 8-174738 | 7/1996 |
| JP | 2005-205305 | 8/2005 |
| WO | 2009/011315 | 1/2009 |
| WO | 2009/072373 | 6/2009 |

\* cited by examiner

POLYTETRAFLUOROETHYLENE POROUS MEMBRANE, METHOD FOR PRODUCING SAME, AND WATERPROOF AIR-PERMEABLE FILTER

TECHNICAL FIELD

The present invention relates to a polytetrafluoroethylene (hereinafter referred to as "PTFE") porous membrane and a method for producing the membrane, and a waterproof air-permeable filter.

BACKGROUND ART

Conventionally, waterproof air-permeable filters have been used, for example, for automobile electrical components, office automation apparatuses, household electrical appliances, and medical equipment in order to eliminate a pressure difference between the inside and outside of a housing accommodating electronic parts, control boards, etc. The waterproof air-permeable filter is attached to the housing so as to close an opening of the housing. The waterproof air-permeable filter serves to provide protection against dust and water while ensuring air permeability. In such a waterproof air-permeable filter, a PTFE porous membrane commonly is used.

Preferably, the PTFE porous membrane used in the waterproof air-permeable filter has a high water pressure resistance in order to ensure waterproofness, and has a high air permeability in order to eliminate the pressure difference.

Generally, the PTFE porous membrane is obtained by stretching an unsintered sheet made of PTFE. The air permeability of the PTFE porous membrane can be increased by increasing the stretching ratio, but the water pressure resistance is lowered accordingly. Thus, it is one of the difficult techniques in this field to produce a PTFE porous membrane having the air permeability and water pressure resistance in good balance.

In the waterproof air-permeable filter, it is general in many cases that the PTFE porous membrane is laminated with a support material, such as a nonwoven fabric, to be reinforced and the support material is welded to a housing. In such cases, the support material melted when being welded may damage the PTFE porous membrane. To deal with this, it is effective to increase the thickness of the PTFE porous membrane, but this decreases the air permeability. As just described, it is difficult to obtain a PTFE porous membrane with a large thickness as well as a high air permeability and water pressure resistance in the case of using a single-membrane structure.

For example, as disclosed in Patent Literature 1, a PTFE porous membrane with a laminated structure in which PTFE porous layers are laminated in order to prevent clogging is proposed as a PTFE porous membrane used as an air filter medium.

CITATION LIST

Patent Literature

PTL 1: JP 2005-205305 A

SUMMARY OF INVENTION

Technical Problem

For example, a porous layer with a dense structure for achieving a high water pressure resistance is manufactured thinly to such an extent as not to impair its air permeability and this porous layer is laminated on a porous layer with a high air permeability and large thickness, so that a PTFE porous membrane with a large thickness as well as a high air permeability and water pressure resistance is obtained.

However, as disclosed in Patent Literature 1, in the case where porous layers merely are manufactured individually and then sintered in a stacked state or bonded to each other with an adhesive, the joining force between the porous layers is small and they tend to be peeled from each other easily. For example, when being laminated with a nonwoven fabric or being cut, the porous layers may be peeled from each other.

In view of these circumstances, the present invention is intended to provide a method for producing a PTFE porous membrane with a laminated structure in which porous layers are unlikely to be peeled from each other, a PTFE porous membrane produced by this production method, and a waterproof air-permeable filter including the PTFE porous membrane.

Solution to Problem

The inventors of the present invention conceived that by preparing a plurality of unsintered sheets made of PTFE and pressure-bonding them to each other, and then stretching a resulting pressure-bonded article so that the unsintered sheets become porous layers, respectively, it is possible to increase the joining force between the porous layers.

Furthermore, the inventors found that a high air permeability can be achieved in the case where PTFE with a low molecular weight is used and a high water pressure resistance can be achieved in the case where PTFE with a high molecular weight is used, even when the stretching ratio is the same in both cases. Then, the inventors noticed that in the case where a plurality of unsintered sheets are stretched at the same time as described above, it is effective to manufacture different types of unsintered sheets from PTFEs with a low molecular weight and a high molecular weight in order to obtain a desired PTFE porous membrane.

As the PTFE with a low molecular weight, PTFE having a standard specific gravity of 2.16 or more is used suitably. As the PTFE with a high molecular weight, PTFE having a standard specific gravity of less than 2.16 is used suitably. Here, the standard specific gravity, which is also referred to as SSG, is a specific gravity measured by a physical measuring method prescribed in JIS K 6892. The standard specific gravity is in an inverse relation to molecular weight (the standard specific gravity shows a negative correlation to molecular weight.)

However, in the case where different types of unsintered sheets are manufactured from PTFEs having various standard specific gravities, the joining force between the porous layers is not increased so much even when the unsintered sheets are pressure-bonded and then stretched as mentioned above. The reason for this is not clear in some points, but it conceivably is because a layer with a high air permeability has a high porosity generally and a layer with a high water pressure resistance is dense and thus the layers have different structures from each other, and thereby the contact portion between the layers is reduced. Furthermore, another reason may be that the fibers of these layers are not entangled with each other at the time of pressure-bonding.

The present invention has been accomplished in view of the foregoing. The present invention provides a method for producing a PTFE porous membrane, including the steps of laminating a first unsintered sheet made of PTFE having a standard specific gravity of 2.16 or more and a second unsintered sheet made of PTFE having a standard specific gravity of less than 2.16, and applying a pressure to a resulting laminated body so as to obtain a pressure-bonded article; stretching the pressure-bonded article in a specified direction at a temperature lower than a melting point of PTFE, and then stretching further the pressure-bonded article in the specified direction at a temperature equal to or higher than the melting point of PTFE or heating the pressure-bonded article to a temperature equal to or higher than the melting point of PTFE; and stretching the pressure-bonded article stretched in the specified direction in a width direction perpendicular to the specified direction.

The present invention also provides a PTFE porous membrane with a laminated structure in which a first PTFE porous layer and a second PTFE porous layer having different fiber structures from each other are laminated. The PTFE porous membrane has a thickness of 20 μm or more, an air permeation quantity of 10 sec/100 mL or less in terms of Gurley number, and a water pressure resistance of 200 kPa or more when measured based on JIS L1092-B (a high water pressure method). Peel strengths between the porous layers in two directions perpendicular to each other and a direction forming an angle of 45 degrees with these directions are 0.1 N/cm or more.

When a peel test is conducted on the PTFE porous membrane by a method as shown in FIG. 2, the peeling force is increased at the beginning of the peeling in some cases, but the peeling force is stabilized as the peeling continues, as shown in FIG. 3. In the present invention, a value obtained by dividing the peeling force (N) at this time (see Point a in FIG. 3) by the width (cm) of the PTFE porous membrane in the width direction perpendicular to the peeling direction is defined as the peel strength.

The present invention further provides a waterproof air-permeable filter including a porous substrate for preventing entry of water while ensuring air permeability. The substrate includes the PTFE porous membrane.

Advantageous Effects of Invention

The present invention makes it possible to obtain a PTFE porous membrane with a laminated structure in which porous layers are unlikely to be peeled from each other.

DESCRIPTION OF EMBODIMENTS

Figure 1:
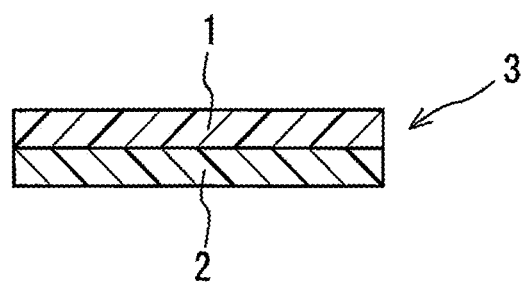
FIG. 1 is a cross-sectional view showing an example of the PTFE porous membrane according to the present invention.

Hereafter, the method for producing the PTFE porous membrane according to the present invention will be described. This production method is a method for obtaining a PTFE porous membrane 3 with a laminated structure in which a first PTFE porous layer 1 and a second PTFE porous layer 2 are laminated as shown in FIG. 1, for example. The first PTFE porous layer 1 has an excellent air permeability because of its relatively coarse fiber structure, and is manufactured from a first unsintered sheet made of PTFE having a standard specific gravity of 2.16 or more. The second PTFE porous layer 2 has an excellent water pressure resistance because of its relatively fine fiber structure, and is manufactured from a second unsintered sheet made of PTFE having a standard specific gravity of less than 2.16.

It should be noted that the PTFE porous membrane according to the present invention needs only include at least one first PTFE porous layer 1 and at least one second PTFE porous layer 2. The total number of the layers may be three or more.

For example, the second PTFE porous layer 2 may be sandwiched between the first PTFE porous layers 1, or two or three porous layers 2 (or 1) of one type may be laminated on one side of the porous layer 1 (or 2) of the other type. The PTFE porous membrane 3 may be used as a substrate of a waterproof air-permeable filter as it is. A support material, such as a nonwoven fabric, may be laminated further on a surface of the porous layer 1 (or 2) to form the substrate of a waterproof air-permeable filter.

Preferably, the PTFE porous membrane 3 has a thickness of 20 μm or more. This is for preventing the PTFE porous membrane 3 from being damaged. More preferably, the thickness is 25 to 50 μm. Preferably, the PTFE porous membrane 3 has an air permeation quantity of 10 sec/100 mL or less in terms of Gurley number, and a water pressure resistance of 200 kPa or more when measured based on JIS L1092-B (a high water pressure method). More preferably, the air permeation quantity is 4 to 8 sec/100 mL and the water pressure resistance is 280 to 350 kPa.

Furthermore, in the PTFE porous membrane 3, peel strengths between the porous layers 1, 2 in three directions: two directions perpendicular to each other; and a direction forming an angle of 45 degrees with these directions preferably are 0.1 N/cm or more. In the PTFE porous membrane 3, the peel strength in an oblique direction forming an angle of 45 degrees with a longer direction (lengthwise direction) and a width direction (lateral direction) during the after-mentioned production tends to be smallest. Thus, when the peel strengths in the above-mentioned three directions are 0.1 N/cm or more, the PTFE porous membrane 3 is judged to have a sufficient peel strength in an arbitrary direction, and the peel between the porous layers 1, 2 hardly occurs in the actual production process. More preferably, the peel strengths in the three directions are 0.2 to 0.5 N/cm.

The PTFE porous membrane 3 described above is produced as follows. First, the first unsintered sheet with a thickness of, for example, 0.15 to 0.3 mm is manufactured from a first PTFE having a standard specific gravity of 2.16 or more, more preferably 2.17 or more. Specifically, a mixture obtained by adding a liquid lubricant to PTFE fine powder is formed into a sheet shape extending in a specified direction, by at least one method of an extrusion method and a roll-pressing method, to obtain a sheet-form body. For example, the PTFE fine powder containing the liquid lubricant is compressed in a cylinder to be preformed, and this is extruded by a ram extruder to be formed into a sheet shape, and then roll-pressed to a thickness suitable for stretching, usually at normal temperature, by a roll pair. Thereafter, the liquid lubricant is removed from the sheet-form body by a heating method or extraction method. Thus, the first unsintered sheet is obtained.

Examples of the first PTFE include: Fluon CD-014 (standard specific gravity 2.20), Fluon CD-1 (standard specific gravity 2.20), and Fluon CD-145 (standard specific gravity 2.19), produced by Asahi Glass Co., Ltd.; Polyflon F-104 (standard specific gravity 2.17) and Polyflon F-106 (standard specific gravity 2.16), produced by Daikin Industries, Ltd.;

and Teflon 6-J (standard specific gravity 2.21) and Teflon 65-N (standard specific gravity 2.16), produced by Du Pont-Mitsui Fluorochemicals Co.

The liquid lubricant is not particularly limited as long as it is capable of wetting the PTFE fine powder and of being removed by a technique such as evaporation and extraction. Examples of the liquid lubricant include hydrocarbons such as liquid paraffin, naphtha, toluene, and xylene, as well as alcohols, ketones, esters, and a fluorine solvent. A mixture of two or more of these also may be used. The amount of the liquid lubricant to be added depends on the method for forming the sheet-form body. Usually, it is about 5 to 50 parts by weight per 100 parts by weight of the PTFE fine powder.

Subsequently, the second unsintered sheet with a thickness of, for example, 0.12 to 0.2 mm is manufactured from a second PTFE having a standard specific gravity of less than 2.16, more preferably equal to or less than 2.155. It should be noted that the second unsintered sheet preferably has a smaller thickness than that of the first unsintered sheet. Since the second unsintered sheet is manufactured in the same manner as the first unsintered sheet, detailed description thereof are omitted.

Examples of the second PTFE include Fluon CD-123 (standard specific gravity 2.155) produced by Asahi Glass Co., Ltd., and Polyflon F-101HE (standard specific gravity 2.142) produced by Daikin Industries, Ltd.

After the first unsintered sheet and the second unsintered sheet are manufactured, at least one first unsintered sheet and at least one second unsintered sheet are laminated and a pressure is applied to a resulting laminated body so as to integrate the first unsintered sheet and the second unsintered sheet with each other. Thus, a pressure-bonded article is obtained. The method and pressure used for obtaining the pressure-bonded article are not particularly limited. For example, the laminated body may be made to pass through the roll pair at a temperature lower than the melting point of PTFE (327° C.) or may be pressed. The degree of the integration is almost sufficient when the first unsintered sheet and the second unsintered sheet seemingly are not separated from each other even during a simple operation such as taking-up operation.

Next, the pressure-bonded article obtained as mentioned above is stretched in the specified direction (longer direction) at a temperature lower than the melting point of PTFE first. Preferably, the stretching factor is 1.5 to 15. This is because a stretching factor more than 15 breaks the fibers (fibrils), and a stretching factor less than 1.5 does not allow the first unsintered sheet and the second unsintered sheet to be fibrous. More preferably, the stretching factor is 2 to 10. Preferably, the temperature at which the stretching is performed is 250 to 300° C.

Thereafter, the pressure-bonded article is stretched in the longer direction at a temperature equal to or higher than the melting point of PTFE. Here, the stretching is a work to change the length of the pressure-bonded article. Preferably, the stretching factor in this process is 0.8 to 10 except for 1, that is, at least 0.8 but less than 1 or more than 1 but not more than 10. This is because a stretching factor more than 10 breaks the fibers (fibrils), and a stretching factor less than 0.8 may cause wrinkles in the pressure-bonded article. Here, stretching by a stretching factor less than 1 may be referred to as "returning." The pressure-bonded article may be stretched by a stretching factor of more than 1 and then subject to the returning so that the total stretching factor falls within the range of 0.8 to 10. In order for the pressure-bonded article to be subject to the returning, the rotating speeds of two transfer rolls around which the pressure-bonded article is wound may be adjusted so that the rotating speed of the transfer roll on the downstream side in the transfer direction is lower than the rotating speed of the transfer roll on the upstream side in the transfer direction, for example. More preferably, the stretching factor by which the pressure-bonded article is stretched in the longer direction at a temperature equal to or higher than the melting point of PTFE is 0.8 to 5. Preferably, the temperature at which the stretching is performed is 350 to 400° C.

Depending on the properties required for the PTFE porous membrane, the pressure-bonded article stretched at a temperature lower than the melting point of PTFE may only be heated to a temperature equal to or higher than the melting point of PTFE without being stretched in the longer direction at a temperature equal to or higher than the melting point of PTFE. Preferably, the heating temperature in this case is 350 to 400° C.

Conceivably, when the pressure-bonded article is stretched at a temperature lower than the melting point of PTFE, and subsequently is stretched in the same direction at a temperature equal to or higher than the melting point of PTFE or heated to a temperature equal to or higher than the melting point of PTFE as mentioned above, the fibers of the PTFEs made of different resins are entangled with each other and this state is set.

After the stretching in the longer direction is completed, the pressure-bonded article is stretched in the width direction perpendicular to the longer direction at a temperature lower than the melting point of PTFE. Preferably, the stretching factor is 4 to 30. This is because a stretching factor more than 30 breaks the fibers (fibrils), and a stretching factor less than 4 fails to extend the fibrils generated during the stretching in the longer direction and a film with a desired air permeability cannot be obtained. More preferably, the stretching factor is 4 to 25. Preferably, the temperature at which the stretching is performed is at least 40° C., which is a temperature at which the first unsintered sheet and the second unsintered sheet are extended easily. More preferably, the temperature is 130 to 150° C.

Finally, heat-setting is applied to the pressure-bonded article stretched in the width direction. The method of heat-setting is not particularly limited. For example, the pressure-bonded article may be heated to a temperature equal to or higher than 300° C., or a temperature equal to or higher than the melting point of PTFE in some cases, with a heater. Or the pressure-bonded article is blown with hot air.

The heat-setting may be omitted in the case where the pressure-bonded article is sintered sufficiently before being stretched in the width direction and has no significant dimensional change after being stretched in the width direction, or in the case where the pressure-bonded article is bonded to the support material, such as a nonwoven fabric, immediately after being stretched in the width direction and has substantially no dimensional change.

Through the above-mentioned steps, the first unsintered sheet becomes the first PTFE porous layer 1 and the second unsintered sheet becomes the second PTFE porous layer 2 so as to obtain the PTFE porous membrane 3 in which the porous layers 1, 2 are unlikely to be peeled from each other. The PTFE porous membrane 3 is suitable for a substrate for preventing entry of water while ensuring air permeability in a waterproof air-permeable filter.

EXAMPLES

Hereinafter, the present invention will be described in detail with reference to Examples, but the present invention is not restricted to these Examples. In the Examples, the air permeation quantity, water pressure resistance, and peel strength were used as comparative properties, and they were measured by the following methods.

The air permeation quantity was measured as follows. Portions with a diameter of 45 mm were punched out, at three points, from the obtained PTFE porous membrane, and the air permeation quantities of these portions were measured based on JIS P8117 (Gurley method) to calculate the average value thereof.

The water pressure resistance was measured as follows. Portions with a diameter of 45 mm were punched out, at three points, from the obtained PTFE porous membrane, and the water pressure resistances of these portions were measured based on JIS L1092-B (high water pressure method) to calculate the average value thereof.

Figure 2:
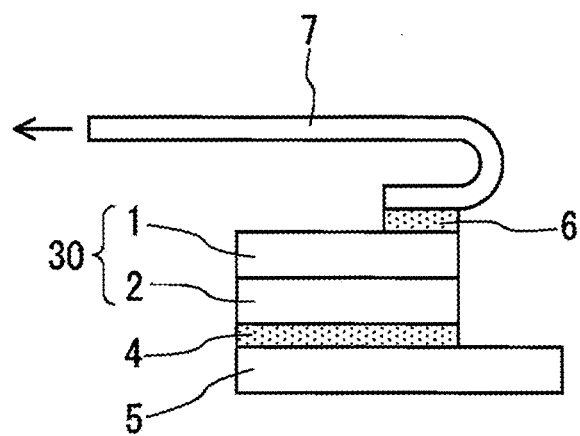
FIG. 2 is a diagram explaining a peel test for measuring the peel strength.
Figure 3:
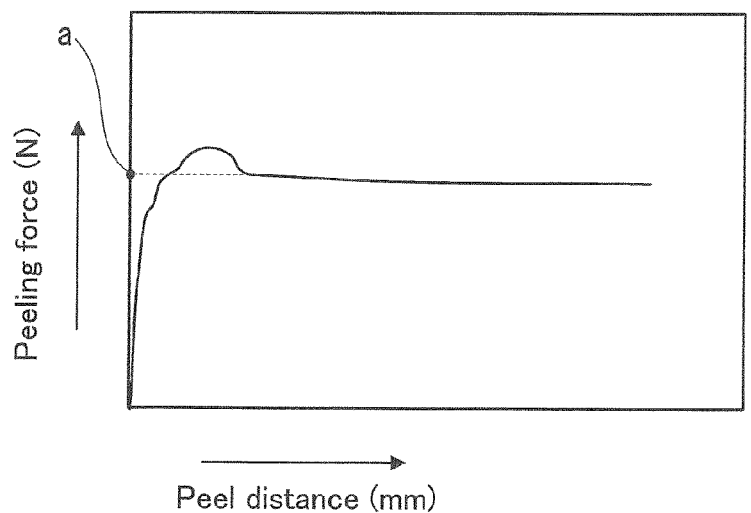
FIG. 3 is a graph showing the relationship between the peel distance and the peeling force when the peeling method shown in FIG. 2 is performed.

The peel strength was measured by conducting a peel strength test as follows. First, three strip-shape samples (with a length of 100 mm and a width of 10 mm), more specifically, a sample extending in the longer direction of the PTFE porous membrane, a sample extending in the width direction of the PTFE porous membrane, and a sample extending in an oblique direction forming an angle of 45 degrees with the longer direction of the PTFE porous membrane, were cut out from the obtained PTFE porous membrane. Subsequently, as shown in FIG. 2, one side of each sample, which is referred to as a sample 30, was bonded to a stainless plate 5 with a double-sided tape 4, and one end of a polyester film 7 was bonded to the other side of the sample 30 at one end (the right end in FIG. 2) of the longer direction with a double-sided tape 6. Then, the other end of the polyester film 7 was pulled in a direction (leftward direction in FIG. 2) from the one end to the other end of the longer direction of the sample 30 at a speed of 200 mm/min and at 25° C. while the polyester film 7 was turned over. The peeling force (tensile force) was measured to calculate the peel strength. This was conducted three times and the average value thereof was calculated.

Example 1

In order to produce the first PTFE porous layer with a high air permeability, the first unsintered sheet with a thickness of 0.2 mm was manufactured from CD-145 (standard specific gravity 2.19) produced by Asahi Glass Co., Ltd., by the above-mentioned method. Also, in order to produce the second PTFE porous layer with a high water pressure resistance, the second unsintered sheet with a thickness of 0.15 mm was manufactured from Polyflon F-101HE (standard specific gravity 2.142) produced by Daikin. Industries, Ltd., by the above-mentioned method. In the state of being stacked, these sheets were pressed by a roll pair at a pressure of 0.1 MPa and at normal temperature to be integrated with each other. Thus, a pressure-bonded article was obtained. The pressure-bonded article was stretched by a factor of 7 in the longer direction (roll-pressing (Erection) at 280° C. first, and then stretched further by a factor of 1.6 in the longer direction at 360° C.

Subsequently, the pressure-bonded article was stretched by a factor of 12 in the width direction at 150° C. Thus, a PTFE porous membrane with a thickness of 35 μm was obtained.

Example 2

A PTFE porous membrane with a thickness of 33 μm was obtained in the same manner as Example 1, except that Polyflon F-104 (standard specific gravity 2.17) produced by Daikin Industries, Ltd. was used instead of CD-145 (standard specific gravity 2.19) produced by Asahi Glass Co., Ltd.

Example 3

The same pressure-bonded article as in Example 2 was produced in the same manner as Example 2 until the pressure-bonded article was obtained. The pressure-bonded article was stretched by a factor of 7 in the longer direction at 280° C. Thereafter, as the second stretching in the longer direction, the pressure-bonded article stretched once was stretched by a factor of 2.0 in the longer direction at 360° C. and then subject to the returning further by a factor of 0.8 so that the total stretching factor of the second stretching in the longer direction was 1.6. Subsequently, the pressure-bonded article was stretched by a factor of 12 in the width direction at 150° C. Thus, a PTFE porous membrane with a thickness of 40 μm was obtained.

Comparative Example 1

In order to produce the first PTFE porous layer with a high air permeability, the first unsintered sheet with a thickness of 0.2 mm was manufactured from Polyflon F-104 (standard specific gravity 2.17) produced by Daikin Industries, Ltd., by a conventional method. Also, in order to produce the second PTFE porous layer with a high water pressure resistance, the second unsintered sheet with a thickness of 0.15 mm was manufactured from Polyflon F-101HE (standard specific gravity 2.142) produced by Daikin Industries, Ltd., by a conventional method. Each of them was stretched individually by a factor of 7 in the longer direction at 280° C. first, and then stretched further by a factor of 1.6 in the longer direction at 360° C. Subsequently, in the state of being stacked, the first unsintered sheet and the second unsintered sheet were stretched by a factor of 12 in the width direction at 150° C. Thus, a PTFE porous membrane with a thickness of 36 μm was obtained.

Comparative Example 2

The same first unsintered sheet and second unsintered sheet as in Comparative Example 1 were produced in the same manner as Comparative Example 1 until the first unsintered sheet and the second unsintered sheet were obtained. Each of them was stretched individually by a factor of 11.2 in the longer direction at 280° C. Subsequently, in the state of being stacked, the first unsintered sheet and the second unsintered sheet were stretched by a factor of 12 in the width direction at 150° C. Then, a resulting laminated body was blown with 400° C. hot air for about 1 minute to be subject to heat-setting. Thus, a PTFE porous membrane with a thickness of 13 μm was obtained. The thickness was about ⅓ of that in Comparative Example 1 because the heat-setting was performed in Comparative Example 2 and the temperature at which the stretching was performed was not equal to or higher than the melting point of PTFE.

Comparative Example 3

Two unsintered sheets with a thickness of 0.2 mm were manufactured from CD-145 (standard specific gravity 2.19) produced by Asahi Glass Co., Ltd., by a conventional method. In the state of being stacked, these sheets were pressed by a roll pair at a pressure of 0.15 MPa and at normal temperature to be integrated with each other. Thus, a pressure-bonded article was obtained. The pressure-bonded article was stretched by a factor of 15 in the longer direction at 280° C., and then stretched by a factor of 20 in the width direction at 170° C. Subsequently, it was subject to heat treatment at 400°

C. for 1 minute. Thus, a PTFE porous membrane with a thickness of 11 µm was obtained.

Comparative Example 4

A PTFE porous membrane with a thickness of 12 µm was obtained in the same manner as Comparative Example 3, except that one of the two unsintered sheets was manufactured from Polyflon F-101HE (standard specific gravity 2.142) produced by Daikin Industries, Ltd.

Comparative Example 5

Two unsintered sheets with a thickness of 0.2 mm were manufactured from CD-145 (standard specific gravity 2.19) produced by Asahi Glass Co., Ltd., by a conventional method. In the state of being stacked, these sheets were pressed by a roll pair at a pressure of 0.1 MPa and at normal temperature to be integrated with each other. Thus, a pressure-bonded article was obtained. The pressure-bonded article was stretched by a factor of 7 in the longer direction at 280° C. first, and then stretched further by a factor of 1.6 in the longer direction at 360° C. Subsequently, it was stretched by a factor of 12 in the width direction at 150° C. Thus, a PTFE porous membrane with a thickness of 33 µm was obtained.

(Comparison of Properties)

Table 1 shows the values of the properties in Examples 1 to 3 and Comparative Examples 1 to 5.

TABLE 1

| | Air permeation quantity (sec/100 mL) | Membrane thickness (µm) | Water pressure resistance (kPa) | Peel strength (N/cm) | | |
|---|---|---|---|---|---|---|
| | | | | Longer direction | Width direction | Oblique direction |
| Example 1 | 4 | 35 | 330 | 0.25 | 0.22 | 0.19 |
| Example 2 | 5 | 33 | 340 | 0.24 | 0.22 | 0.18 |
| Example 3 | 3 | 40 | 310 | 0.33 | 0.41 | 0.25 |
| C. Example 1 | 7 | 36 | 330 | 0.12 | 0.13 | 0.09 |
| C. Example 2 | 1 | 13 | 420 | 0.02 | 0.03 | 0.01 |
| C. Example 3 | 0.2 | 11 | 165 | 0.06 | 0.08 | 0.07 |
| C. Example 4 | 1.8 | 12 | 380 | 0.05 | 0.03 | 0.04 |
| C. Example 5 | 0.3 | 33 | 65 | 0.23 | 0.41 | 0.32 |

Table 1 reveals that in the PTFE porous membranes in Examples 1 to 3, both the air permeability and water pressure resistance were high, and the peel strengths in the three directions all exceeded 0.1 N/cm.

In contrast, in Comparative Examples 1, 2, in which the unsintered sheets were stretched individually in the longer direction, the peel strengths were low. Furthermore, comparing Examples 1, 3 with Comparative Examples 3, 4, in which the pressure-bonded articles were stretched at a temperature lower than the melting point of PTFE, it has been found that in order to achieve a high peel strength, it is important to stretch the pressure-bonded article at a temperature equal to or higher than the melting point of PTFE. Also, the results of Comparative Example 5 indicate that a high water pressure resistance cannot be achieved by merely using PTFE with a standard specific gravity exceeding 2.16 and providing a dual layer structure.

Figure 4:
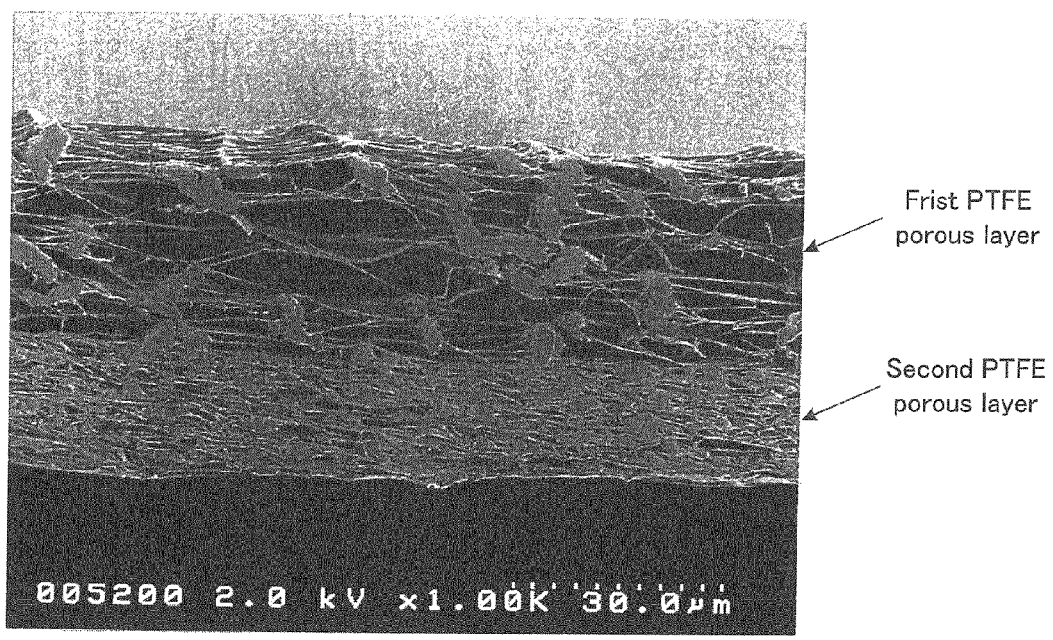
FIG. 4 is a photomicrograph of a cross section of the PTFE porous membrane in Example 1.

In addition, in order to confirm the structure of the PTFE porous membrane obtained by the production method according to the present invention, the PTFE porous membrane in Example 1 was cut and a cross section thereof was photographed. FIG. 4 shows the photomicrograph. The photomicrograph shown in FIG. 4 reveals that the first PTFE porous layer has a relatively coarse fiber structure and the second PTFE porous layer has a relatively fine fiber structure.

The invention claimed is:

1. A method for producing a polytetrafluoroethylene porous membrane, comprising the steps of:
   laminating a first unsintered sheet made of polytetrafluoroethylene having a standard specific gravity of 2.16 or more and a second unsintered sheet made of polytetrafluoroethylene having a standard specific gravity of less than 2.16, and applying a pressure to a resulting laminated body so as to obtain a pressure-bonded article;
   stretching the pressure-bonded article in a specified direction at a temperature lower than a melting point of polytetrafluoroethylene, and then stretching further the pressure-bonded article in the specified direction at a temperature equal to or higher than the melting point of polytetrafluoroethylene or heating the pressure-bonded article to a temperature equal to or higher than the melting point of polytetrafluoroethylene; and
   stretching the pressure-bonded article stretched in the specified direction in a width direction perpendicular to the specified direction.

2. The method for producing the polytetrafluoroethylene porous membrane according to claim 1, wherein the step of stretching the pressure-bonded article in the width direction is performed at a temperature lower than the melting point of polytetrafluoroethylene, and
   the method further comprises the step of applying heat-setting to the pressure-bonded article stretched in the width direction.

3. The method for producing the polytetrafluoroethylene porous membrane according to claim 1, wherein a stretching factor by which the pressure-bonded article is stretched in the specified direction at the temperature lower than the melting point of polytetrafluoroethylene is 1.5 to 15, and a stretching factor by which the pressure-bonded article is stretched in the specified direction at the temperature equal to or higher than the melting point of polytetrafluoroethylene is 0.8 to 10 except for 1.

4. The method for producing the polytetrafluoroethylene porous membrane according to claim 1, wherein a stretching factor by which the pressure-bonded article is stretched in the width direction is 4 to 30.

5. The method for producing the polytetrafluoroethylene porous membrane according to claim 1, wherein the second unsintered sheet has a smaller thickness than that of the first unsintered sheet.

6. A polytetrafluoroethylene porous membrane with a laminated structure in which a first polytetrafluoroethylene porous layer and a second polytetrafluoroethylene porous layer having different fiber structures from each other are laminated, wherein the polytetrafluoroethylene porous membrane has a thickness of 20 μm or more, an air permeation quantity of 10 sec/100 mL or less in terms of Gurley number, and a water pressure resistance of 200 kPa or more when measured based on JIS L1092-B (a high water pressure method), and peel strengths between the porous layers in two directions perpendicular to each other and a direction forming an angle of 45 degrees with these directions are 0.1 N/cm or more.

7. A waterproof air-permeable filter comprising a porous substrate for preventing entry of water while ensuring air permeability, wherein the substrate includes the polytetrafluoroethylene porous membrane according to claim 6.

8. A polytetrafluoroethylene porous membrane with a laminated structure in which a first polytetrafluoroethylene porous layer and a second polytetrafluoroethylene porous layer having different fiber structures from each other are laminated, wherein the polytetrafluoroethylene porous membrane has a thickness of 20 μm or more, an air permeation quantity of 10 sec/100 mL or less in terms of Gurley number, and a water pressure resistance of 200 kPa or more when measured based on JIS L1092-B (a high water pressure method), and peel strengths between the porous layers in two directions perpendicular to each other and a direction forming an angle of 45 degrees with these directions are 0.1 N/cm or more;

wherein the polytetrafluoroethylene porous membrane is obtained by the production method according to a method for producing a polytetrafluoroethylene porous membrane, comprising the steps of:

laminating a first unsintered sheet made of polytetrafluoroethylene having a standard specific gravity of 2.16 or more and a second unsintered sheet made of polytetrafluoroethylene having a standard specific gravity of less than 2.16, and applying a pressure to a resulting laminated body so as to obtain a pressure-bonded article;

stretching the pressure-bonded article in a specified direction at a temperature lower than a melting point of polytetrafluoroethylene, and then stretching further the pressure-bonded article in the specified direction at a temperature equal to or higher than the melting point of polytetrafluoroethylene or heating the pressure-bonded article to a temperature equal to or higher than the melting point of polytetrafluoroethylene; and stretching the pressure-bonded article stretched in the specified direction in a width direction perpendicular to the specified direction.

\* \* \* \* \*